(12) United States Patent
Zhang

(10) Patent No.: US 8,871,370 B2
(45) Date of Patent: Oct. 28, 2014

(54) WATER BASED BIOLOGICAL AND PHOTOCHEMICAL BATTERIES

(76) Inventor: Jian Zhang, Pomona, NY (US)

( * ) Notice: Subject to any disclaimer, the term of this patent is extended or adjusted under 35 U.S.C. 154(b) by 977 days.

(21) Appl. No.: 12/924,272

(22) Filed: Sep. 24, 2010

(65) Prior Publication Data

US 2012/0077066 A1 Mar. 29, 2012

(51) Int. Cl.
*H01M 4/36* (2006.01)

(52) U.S. Cl.
CPC ........................................ *H01M 4/36* (2013.01)
USPC ........................................... 429/101; 429/401

(58) Field of Classification Search
None
See application file for complete search history.

(56) References Cited

U.S. PATENT DOCUMENTS

2008/0032047 A1* 2/2008 Parashar et al. ............. 427/372.2

OTHER PUBLICATIONS

A. M. Kannan, V. Renugopalakrishnan, S. Filipek, P. Li, G. F. Audette, and L. Munukutla, Bio-Batteries and Bio-Fuel Cells: Leveraging on Electronic Charge Transfer Proteins, 2008, American Scientific Publishers, vol. 8, pp. 1-13.*
George H. Miley, Nie Luo, Joseph Mather, Rodney Burton, Glenn Hawkins, Lifeng Gu, Ethan Byrd, Richard Gimlin, Prajakti Joshi Shrestha, Gabriel Benavides, Julia Laystrom, and David Carroll, Direct NaBH4/H2O2 fuel cells, 2007, Elsevier B.V., vol. 165, pp. 509-516.*
Rosales et al., Advances in the Electro-Fenton Process for Remediation of Recalcitrant Organic Compounds, 2012, 35, No. 4, 609-617.*

* cited by examiner

*Primary Examiner* — Patrick Ryan
*Assistant Examiner* — Haixia Zhang

(57) ABSTRACT

The designs of prototype batteries are described based on some biological Fenton reactions and the photo-excitation of singlet oxygen. The biological battery consists of hydrogen peroxide (or an acid) and ferrous gluconate complexed with a second ligand. Salts such as sodium chloride or ammonium chloride are used as the electrolyte. The photochemical battery uses an aqueous paste of ferrous gluconate with an additional ligand and is irradiated by light. The power of the battery is higher by adding small amount of titanium oxide to ferrous gluconate. The power of these batteries can be increased by using higher concentration of the chemicals or connecting multiple batteries in sequence and/or in parallel. Replacing ferrous ion with cupric ions increases the current of the battery by about 20 times.

1 Claim, 5 Drawing Sheets

Ferrous gluconate

Acetaminophen         Dextromethorphan

Guaifenesin            Caffeine

EDTA

Ferrous gluconate

Acetaminophen

Dextromethorphan

Guaifenesin

Caffeine

EDTA

Sequential Connection:

Parallel Connection:

WATER BASED BIOLOGICAL AND PHOTOCHEMICAL BATTERIES

BACKGROUND

Electricity generation and battery technologies are important and attract wide interest from the scientific field. Most power production technologies require consumption of fossil fuel or natural gas; the common marketed batteries contain chemicals that need to be recycled due to toxicity concern or are un-renewable. Hence, alternative clean energy is more desirable in the long term. This patent describes the utilization of some biological and photochemical reactions in water for electricity generation.

Fenton reaction typically refers to the decomposition of hydrogen peroxide to hydroperoxide radicals or oxygen which is catalyzed by transition metal ions such as $Fe^{3+}$ and $Cu^{2+}$. Certain Fenton reactions are critical to some biological functions such as breathing, DNA synthesis, metabolism, oxidative stress and aging. These reactions are efficient, self-propelled and produce little toxic waste. It was found that Fenton chemistry is influenced by the binding of metal ions by ligands such as —COO$^-$, —NH$^{3+}$, —ArOH and —SH (and the oxidized forms) in peptides and proteins. The strength of the ligands, the electronic configuration of the metals, steric effect and ionic strength of the solution affect the reaction kinetics. In other studies, it was found that the metal ions can catalyze the oxidation of some substances even in the absence of hydrogen peroxide. The oxidant is simply the oxygen in the air, and the reaction rate is increased by exposing to light. The above observations are the results of the changes in the redox potential of the metal ions and oxygen under the specific reaction conditions. This invention describes the separation of some biological Fenton and photoreactions into two half cells in order to develop batteries. These batteries are clean and use chemicals that are ample in nature.

DETAILED DESCRIPTION OF THE INVENTION

The biological batteries consist of hydrogen peroxide or an acid in the cathode and ferrous gluconate in the anode (FIG. 1). Ferrous gluconate is mixed with compounds such as acetaminophen, dextromethrophan, guaifenesin, caffeine, or EDTA (FIG. 2). These molecules serve as the second ligand chelating with ferrous gluconate and can replace the expensive and labile proteins/peptides that were mentioned earlier. The anode material may be suspended in an aqueous paste of wax, cellulose, starch, stearate, polyethylene glycol, etc. Sodium chloride is the electrolyte in this battery presentation while other salts such as NH$_4$Cl and NaI can also be used. The electrolyte serves to increase conductivity and reduce resistance. The electrical power can be increased by using higher concentrations of the chemicals. The voltage of the battery is much lowered if using ferrous gluconate or the ligands alone in the anode. The synergetic effect of the mixture can be attributed to the change in the redox potential of ferrous ion when it adopts the $d^2sp^3$ hybridization configuration and shares the electrons with the dual ligands. As FIG. 2 shows, ferrous gluconate is a metal complex that has four ligands bonded with iron. Perfect iron chelates are octahedrons (FIG. 3); hence the other two coordination bonds may be bonded to the second ligand and oxygen. Alternatively the gluconate may be completely swapped with the second ligand depending on the affinity of the ligands for the metal. The field strength of some example ligands is shown in the following descending order: —CN>—COOH>—NO$_2$>—NH$_3$>—NCS>H$_2$O>—OH>F>—Cl>—SCN>—Br>—I. Because of steric effect, the octahedron structure may not be formed perfectly if the ligands are bulky, which leave some space for oxygen to bind to the metal like in the hemoglobin heme. An electron then migrates from the oxygenated ferrous complex to the cathode; the hydrogen peroxide molecules at the cathode decompose to oxygen and water upon gaining the electron from the anode. If acids are used at the cathode in lieu of hydrogen peroxide, it will reduce oxygen to water. Iron can stay in the ferrous state for a long time as a chelate because the ferric state quickly reduces back to the ferrous state by sharing the electrons from the ligands and water. The choice of the ligands is very important. If they auto-oxidize upon binding to the metal, the ligands will lose the synergetic function quickly. Conversely, if they don't bind together in a right way, the chelate will not provide high enough voltage and current.

The photochemical batteries consist of saturated saline or a paste of ferrous gluconate and the second ligand in the anode that is irradiated by light; the cathode is submersed in un-irradiated saline or an acidic solution (FIG. 4). The electric signal decreases or disappears if lighting is removed. It is apparent that water and ferrous gluconate become stronger oxidants (along with singlet oxygen) when exposed to light. The calculated reduction potential of singlet oxygen is reported as 1.7 V in the literature. The energy to excite the ferrous electrons appears reduced because of the chelation mechanism. In other words, ferrous gluconate with an additional ligand has some photosensitizing function. The power of this battery is higher in the presence of small amount of titanium oxide.

Besides increasing the concentration of chemicals, the voltage can be increased by connecting the batteries in sequence and the current can be increased by connecting them in parallel (FIG. 5). This is similar to the grid used in silicon solar panels. Increasing the thickness of the electrodes also increases the current.

In a previous study with peptides and cupric ion, it was found that cupric ion is a more efficient catalyst than ferric ion for Fenton reactions. It is confirmed in this work that a battery containing copper chelates (or combination of iron and copper) will give higher voltage and current (>20×) than iron chelates. This may be because the ligand electrons fill the sp$^3$ orbitals of copper ions under Jahn-Teller effect as opposed to overlapping with the $d^2sp^3$ orbitals of ferrous ions. In addition, the metal chelates used in these batteries may function like a semiconductor because there are "electron holes" that can accommodate radical species and convey electrons.

SUMMARY OF THE INVENTION

The designs of prototype batteries are described based on some biological Fenton reactions and the photo-excitation of singlet oxygen. The biological battery consists of hydrogen peroxide or an acid in the cathode, and ferrous gluconate mixed with a second ligand in the anode. Sodium chloride or ammonium chloride is used as the electrolyte. The photochemical battery consists of saturated saline or an aqueous paste of ferrous gluconate with an additional ligand in the anode that is irradiated by light; the cathode is submersed in solutions of an acid or hydrogen peroxide in the presence of the electrolyte. The power of the battery is higher by adding small amount of titanium oxide to ferrous gluconate. The voltage can be further increased by connecting the batteries in sequence and the current can be increased by connecting them in parallel. Using higher concentration of the chemicals or copper ion also give power. The advantages of these batteries are that the chemicals used are nontoxic and have ample supply in nature as well as renewable.

REFERENCES

1. Perutz, M. F. et. al., Structure of Hemoglobin: A Three-Dimensional Fourier Synthesis at 5.5-Å. Resolution, Obtained by X-Ray Analysis. Nature, 185, 416-422 (1960)
2. Wikipedia on hemoglobin (http://en.wikipedia.org/wiki/Hemoglobin)
3. Jiang, W. et. al., A Manganese(IV)/Iron(III) Cofactor in *Chlamydia trachomatis* Ribonucleotide Reductase. *Science*, Vol. 316, 1188 (2007)
4. Voevodskaya, N. et. al., Redox Intermediates Of The Mn—Fe Site In Subunit R2 Of *Chlamydia Trachomatis* Ribonucleotide Reductase: An X-Ray Absorption And EPR Study. *J. Biol. Chem*. In Press, First published on Dec. 17, 2008
5. Zhang, J. et. al., Structure of electron transfer flavoprotein-ubiquinone oxidoreductase and electron transfer to the mitochondrial ubiquinone pool. *Proc. Nat. Acd. Sci.*, 103 (44), 16212-16217 (2006)
6. Iwata, S. et. al., Complete Structure of the 11-Subunit Bovine Mitochondrial Cytochrome $bc_1$ Complex. *Science*, Vol. 281, 64-71 (1998)
7. Emerson, J. P. et. al., Swapping metals in Fe- and Mn-dependent dioxygenases: Evidence for oxygen activation without a change in metal redox state. *Proc. Nat. Acd. Sci.*, 105(21), 7347-7352 (2008)
8. Zhang, J. and Kalonia, D. S., The effect of neighboring amino acid residues and solution environments on the oxidative stability of tyrosine in small peptides. *AAPS PharmSciTech*, 8(4) Article 102 (2007)
9. Lawrance, G. A., Introduction to coordination chemistry, Wiley publishing (2010)
10. Wardle, B., Principle and application of photochemistry, Wiley publishing (2009)
11. Yates, S. F. et. al., Titanate bound photosensitizer for producing singlet oxygen. U.S. Pat. No. 4,915,804 (1990)
12. Seely, G. R., Photooxidative destruction of organic wastes. U.S. Pat. No. 3,951,797 (1976)
13. Lundström, M., Redox potential characteristics of cupric chloride solutions. *Hydrometallurgy*, 95(3-4), 285-289 (2009)
14. Campbell, N. R. C & Hasinoff, B. B., Iron supplements: a common cause of drug interactions. *Br. J. din. Pharmac.*, 31, 251-255 (1991)
15. Mellican, R. I. et. al., The role of iron and the factors affecting off-color development of polyphenols. *J. Agric. Food Chem.*, 51 (8), 2304-2316 (2003)
16. Busch, G. E., Twarowski, A. J. Solid phase photosensitizer for generation of singlet oxygen, U.S. Pat. No. 4,579,837 (1986)
17. Kakinoki, K. et. al., Effect of relative humidity on the photocatalytic activity of titanium dioxide and photostability of famotidine, *J. Pharm. Sci.* 93(3), 582-589 (2004)
18. Miyake et. Al., Photoelectric conversion device and photoelectric cell, U.S. Pat. No. 6,350,946 B1 (2002)

Figure 1:
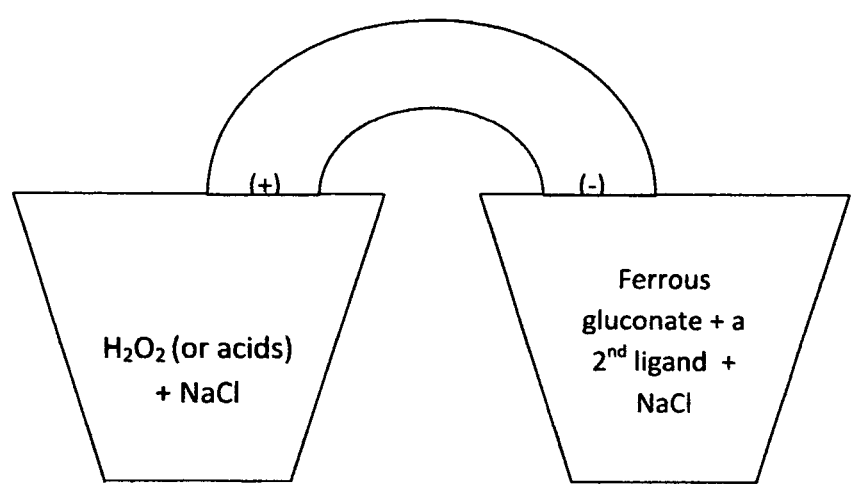
FIG. 1: Diagram of a simulated biological battery
Figure 2:
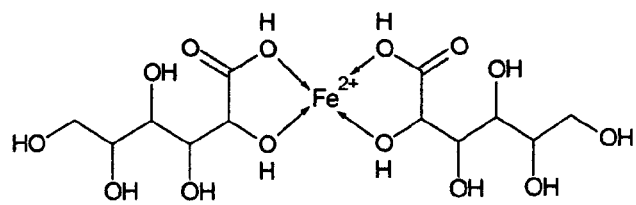
FIG. 2: Structural formula of ferrous gluconate, acetaminophen, dextromethrophan, guaifenesin, caffeine and EDTA
Figure 2:
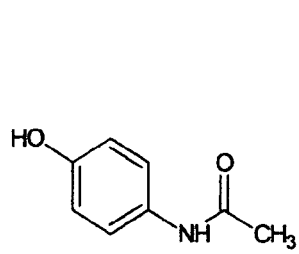
Figure 2:
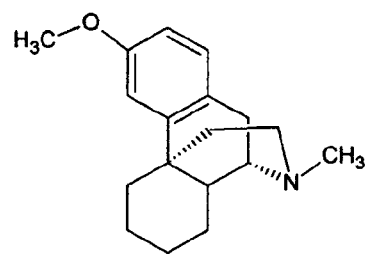
Figure 2:
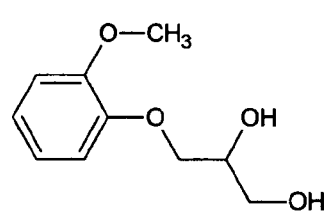
Figure 2:
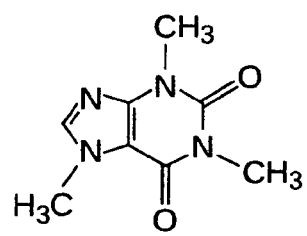
Figure 2:
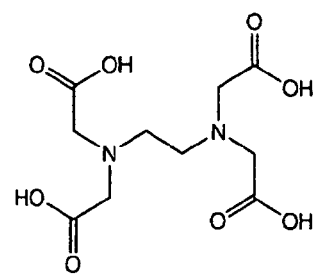
Figure 3:
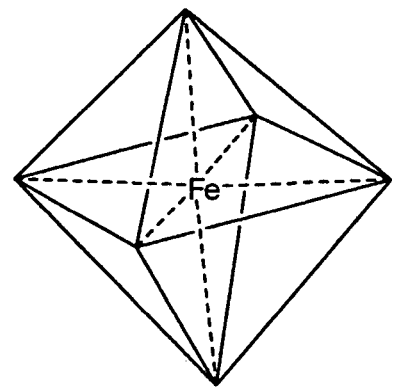
FIG. 3: Octahedron structure of iron chelates
Figure 4:
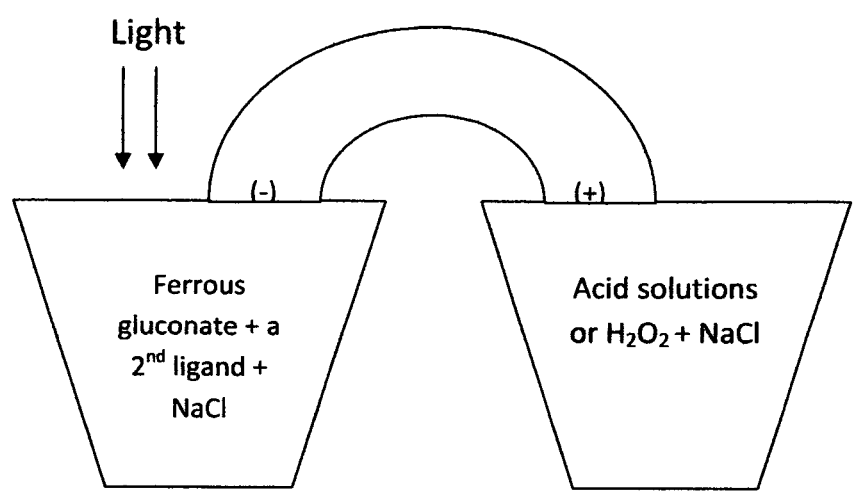
FIG. 4: Diagram of a photochemical battery
Figure 5:
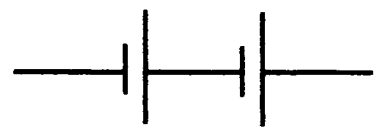
FIG. 5: Sequential and parallel circuits of two batteries
Figure 5:
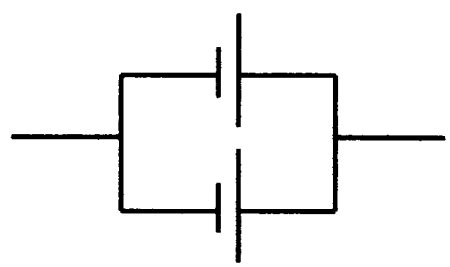

The invention claimed is:
1. A biological battery comprising hydrogen peroxide or an acid in a cathode; ferrous gluconate complexed with acetaminophen, dextromethrophan, guaifenesin, or caffeine in an anode; and an electrolyte medium mixed with cellulose.

* * * * *